(12) United States Patent
Liao

(10) Patent No.: US 7,305,498 B2
(45) Date of Patent: Dec. 4, 2007

(54) CIRCUIT FOR TRANSMITTING ELECTRONIC SIGNALS ON A STATUS OF CONNECTIVITY OF AN ELECTRONIC DEVICE

(75) Inventor: Yi-Lan Liao, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 574 days.

(21) Appl. No.: 10/900,861

(22) Filed: Jul. 27, 2004

(65) Prior Publication Data
US 2005/0132097 A1 Jun. 16, 2005

(30) Foreign Application Priority Data
Dec. 12, 2003 (TW) .............................. 092135156 A

(51) Int. Cl.
G06F 3/00 (2006.01)
G06F 13/00 (2006.01)
G06F 12/00 (2006.01)
H01R 9/22 (2006.01)

(52) U.S. Cl. .............................. 710/15; 710/19; 710/8; 710/74; 711/100; 711/112; 439/43; 439/894

(58) Field of Classification Search .................... 710/8, 710/15, 19, 74; 711/100, 112; 439/43, 894
See application file for complete search history.

(56) References Cited

U.S. PATENT DOCUMENTS

| 6,075,345 | A | * | 6/2000 | Lee | .......................... | 320/138 |
| 6,735,650 | B1 | * | 5/2004 | Rothberg | ..................... | 710/74 |
| 6,879,809 | B1 | * | 4/2005 | Vega et al. | ................ | 455/41.1 |
| 6,983,338 | B2 | * | 1/2006 | Hadba et al. | ................. | 710/74 |

* cited by examiner

*Primary Examiner*—Tammara Peyton
(74) *Attorney, Agent, or Firm*—Wei Te Chung

(57) ABSTRACT

A circuit (11) utilizing a serial advanced technology attachment (ATA) interface for transmitting connectivity signals from the serial ATA interface to a controller (10) in order for the controller to determine a status of connectivity of a hard drive disk (HDD) (21) to the serial ATA interface. The circuit includes an input end (A) connecting to a ground end of the serial ATA interface, and electronically connecting to a high voltage source; a positive-negative-positive (PNP) tripolar transistor (Q1), a first negative-positive-negative (NPN) tripolar transistor (Q2), a second NPN tripolar transistor (Q3), and an output end connecting a collector of the second NPN tripolar transistor with the controller for outputting voltage signals to the controller. The controller is a programmable microprocessor for determining whether or not the HDD is connected to the serial ATA interface, based on the voltage signals input to the controller.

7 Claims, 1 Drawing Sheet

CIRCUIT FOR TRANSMITTING ELECTRONIC SIGNALS ON A STATUS OF CONNECTIVITY OF AN ELECTRONIC DEVICE

BACKGROUND OF THE INVENTION

1. Field of the Invention

The present invention relates to a circuit for transmitting electronic signals on a status of an electronic device, and particularly to a circuit for transmitting electronic signals on a status of connectivity between the electronic device and an interface.

2. Description of Related Art

Because of the low transmission speeds of conventional parallel Advanced Technology Attachment (ATA) interfaces, storage devices such as hard drive disks (HDDs) which employ the ATA interfaces are increasingly becoming bottlenecks of computer systems. The introduction of serial ATA interfaces may solve this problem. A serial ATA interface has a higher transmission speed than a parallel ATA interface. For example, the serial ATA1.0 interface has a standard transmission speed of 150 Megabytes per second (Mbps), whereas the parallel ATA/133 interface has a standard transmission speed of only 133 Mbps. And a maximum transmission speed of the serial ATA interface is 600 Mbps. In addition, the serial ATA interface is less complicated than the parallel ATA interface. That is, only four pins or seven pins are needed for meeting the functional requirements of the serial ATA interface. Furthermore, the serial ATA interface has improved extensibility compared to the parallel ATA interface.

When an electronic device employs a serial ATA interface in a particular application, it is necessary to determine whether a bus in the electronic device is being utilized. Conventionally, if the electronic device employs a parallel ATA interface, the electronic device collects relevant data employing a designated pin in the parallel ATA interface. However, in the case of the serial ATA interface, the number of pins of the serial ATA interface is reduced, and there may be no pin available for collecting the relevant data. If an extra signal line is employed to collect the data, this necessarily entails extra costs. Consequently, a circuit is needed for transmitting the needed data without incurring extra costs.

SUMMARY OF THE INVENTION

An objective of the present invention is to provide a circuit for conveniently transmitting electronic signals regarding connectivity between an electronic device and an interface.

In order to fulfill the above-mentioned objective, the present invention provides a circuit utilizing a serial advanced technology attachment (ATA) interface, for transmitting connectivity signals from the serial ATA interface to a controller in order for the controller to determine a status of connectivity between an electronic device and the serial ATA interface. The circuit comprises an input end connecting to a ground end of the serial ATA interface, and electronically connecting to a high voltage source; a positive-negative-positive (PNP) tripolar transistor, a first negative-positive-negative (NPN) tripolar transistor, a second NPN tripolar transistor, and an output end connecting a collector of the second NPN tripolar transistor and the controller. The controller is a programmable microprocessor. A base of the PNP tripolar transistor is connected to the input end via a first resistor, and an emitter of the PNP tripolar transistor is connected to a VCC via a fourth resistor. A base of the first NPN tripolar transistor is connected to the emitter of the PNP tripolar transistor via a second resistor, and a collector of the first NPN tripolar transistor is connected to the VCC via a fifth resistor. A base of the second NPN tripolar transistor is connected to the collector of the first NPN tripolar transistor via a third resistor, and a collector of the second NPN tripolar transistor is connected to the VCC via a sixth resistor. The input end is electronically connected to the output end. A collector of the PNP tripolar transistor and emitters of the first and second NPN tripolar transistors are grounded.

Other objects, advantages and novel features of the present invention will become more apparent from the following detailed description when taken in conjunction with the accompanying drawing, in which:

DETAILED DESCRIPTION OF THE INVENTION

Figure 1:
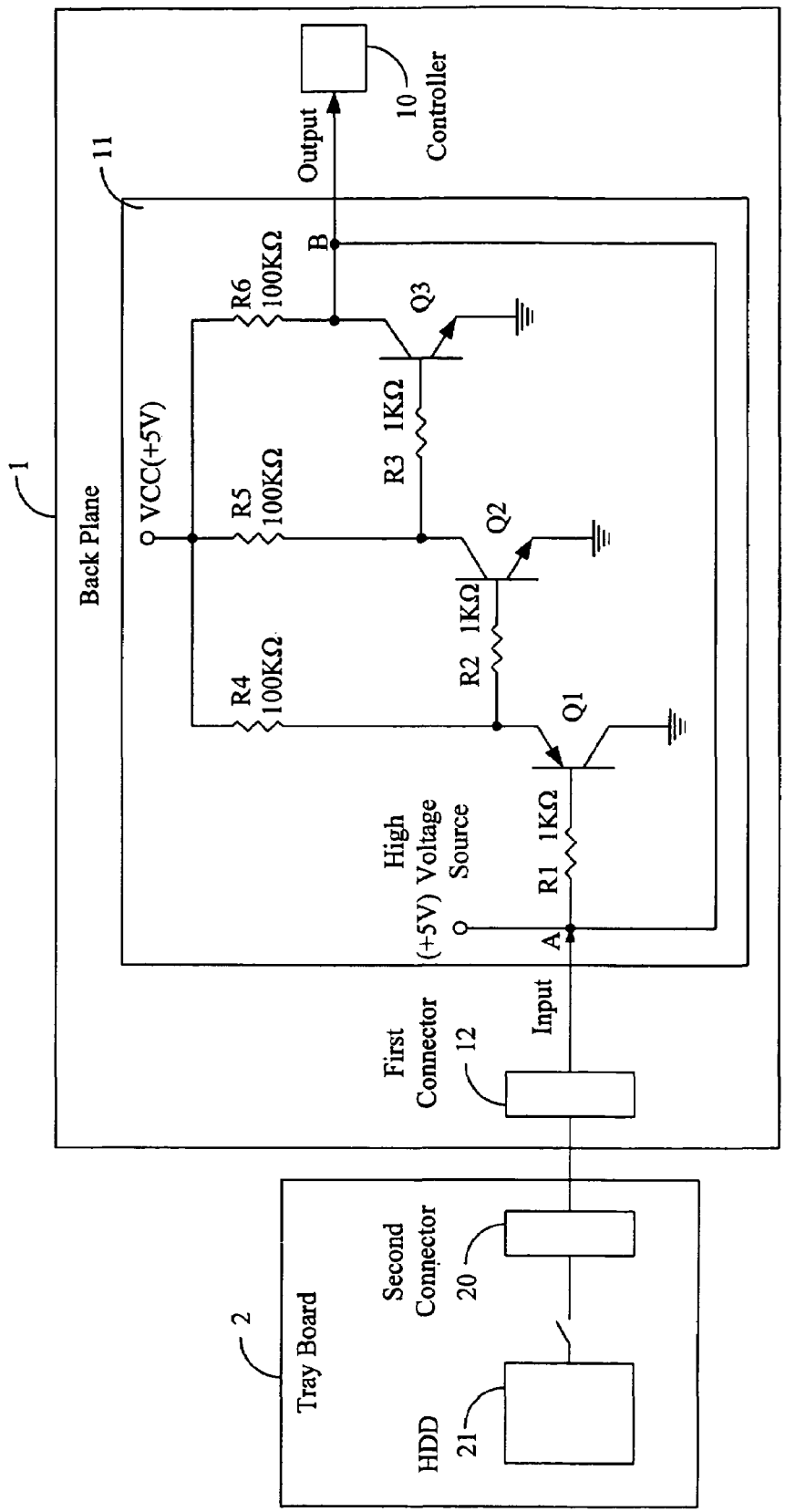
FIG. 1 is a block diagram of an application environment of a circuit for transmitting connectivity signals according to the present invention.

FIG. 1 is a block diagram of an application environment of a circuit for transmitting control signals of the present invention. In the application environment, a back plane 1 is a control center in an electronic device. The back plane 1 comprises a controller 10, a control circuit 11, and a first connector 12. A tray board 2 comprises a second connector 20. An electronic element such as a hard disk drive (HDD) 21 may be attached to the tray board 2 and coupled with the second connector 20. The HDD 21 is hot-swappable with respect to the second connector 20. The second connector 20 is also connected to the first connector 12, and functions as an interface between the HDD 21 and the back plane 1. In the present invention, the first connector 12 and the second connector 20 employ serial ATA interfaces that are compatible with each other. Each serial ATA interface has four data pins (pin 2, pin 3, pin 5 and pin 6), and three ground pins (pin 1, pin 4 and pin 7).

The control circuit 11 has an input end (marked as point A) that is connected to one of the three ground pins of the first connector 12, and an output end (marked as point B) connected to the controller 10. The controller 10 is a programmable microprocessor, which receives voltage signals output from the control circuit 11 and then determines whether the HDD 21 is connected to the second connector 20 based on the received voltage signals.

In the present invention, three tripolar transistors are employed: one is a positive-negative-positive (PNP) tripolar transistor Q1 and the other two are negative-positive-negative (NPN) tripolar transistors Q2 and Q3. Each tripolar transistor has three terminals: a base, an emitter, and a collector. The base of the tripolar transistor Q1 is connected to the input end of the control circuit 11 by way of a resistor R1. The emitter of the tripolar transistor Q1 is connected to the base of the tripolar transistor Q2 via a resistor R2. The collector of the tripolar transistor Q2 is connected to a base of the tripolar transistor Q3 via a resistor R3. The collector of the tripolar transistor Q3 is connected to the controller 10 as the output end of the control circuit. The emitters of the tripolar transistors Q2 and Q3, and a collector of the tripolar transistor Q1 are grounded. The emitter of the tripolar transistor Q1, the collector of the tripolar transistor Q2 and the collector of the tripolar transistor Q3 are connected to a VCC (+5 volts) respectively via a resistor R4, a resistor R5 and a resistor R6. Point A of the input end of the control circuit 11 is electronically connected to a high voltage source, which has a rating of +5 volts. Point A of the input end is also directly connected to point B of the output end by an electric line.

In the present invention, a switching effect of the tripolar transistors Q1, Q2 and Q3 is utilized. Ratings of the resistors R1, R2, R3, R4, R5 and R6 ensure that the tripolar transistors Q1, Q2 and Q3 each operate in only one of two statuses: saturation and cutoff. In the present embodiment, ratings of the resistors R1, R2 and R3 are each 1 kilo-ohm (KΩ), and ratings of the resistors R4, R5 and R6 are each 100 KΩ. When the HDD 21 is not connected to the second connector 20, the ground pin connected to the input end of the control circuit 11 is pull high. Accordingly, the base of the tripolar transistor Q1 that is connected to the input end of the control circuit 11 is at a high voltage level for connected to the high voltage source of +5 volts, and the tripolar transistor Q1 is in the cutoff status. Thus the emitter of the tripolar transistor Q1 and in turn the base of the tripolar transistor Q2 are at the high voltage level, for linking with the VCC of +5 volts. Consequently, the tripolar transistor Q2 is in the saturation status, which means that the collector of the tripolar transistor Q2 and the base of the tripolar transistor Q3 are grounded by way of the emitter of the tripolar transistor Q2. Because the base of the tripolar transistor Q3 is grounded, the tripolar transistor Q3 is in the cutoff status, and the collector of the tripolar transistor Q3 and in turn the output end of the control circuit 11 are not grounded. On the other hand, the output end connected to the input end that is at the high voltage level is not grounded. Therefore, the output end is also at the high voltage level. Accordingly, any input to the controller 10 is at the high voltage level.

When the HDD 21 is connected to the second connector 20, the ground pin connected to the input end of the control circuit 11 is grounded by way of the HDD 21. The base of the tripolar transistor Q1 that is connected to the input end of the control circuit 11 is correspondingly at a low voltage level, and the tripolar transistor Q1 is in the saturation status. Thus the emitter of the tripolar transistor Q1 and in turn the base of the tripolar transistor Q2 are at the low voltage level, because of the grounding of the collector of the tripolar transistor Q1. Consequently, the tripolar transistor Q2 is in the cutoff status, which means that the collector of the tripolar transistor Q2 and the base of the tripolar transistor Q3 are at the high voltage level, for linking with the VCC of +5 volts. Because the base of the tripolar transistor Q3 is at the high voltage level, the tripolar transistor Q3 is in the saturation status, and the collector of the tripolar transistor Q3 and in turn the output end of the control circuit 11 are grounded by way of the emitter of the tripolar transistor Q3. On the other hand, the output end is connected to the input end that is at the low voltage level. Therefore, the output end is also at the low voltage level. Accordingly, any input to the controller 10 is at the low voltage level.

In summary, the controller 10 can determine whether or not the HDD 21 is connected to the tray board 2 based on the voltage levels input to the controller 10. When the high voltage level is input to the controller 10, the controller 10 determines that the HDD 21 is not connected to the tray board 2. In contrast, when the low voltage level is input to the controller 10, controller 10 determines that the HDD 21 is connected to the tray board 2. Furthermore, when the HDD 21 is removed from the tray board 2, the controller 10 can detect the occurrence of the removal in real time.

While a preferred embodiment of the present invention has been described above, it should be understood that it has been presented by way of example only and not by way of limitation. Thus the breadth and scope of the present invention should not be limited by the above-described exemplary embodiment, but should be defined only in accordance with the following claims and their equivalents.

What is claimed is:

1. A circuit utilizing a serial advanced technology attachment (ATA) interface for transmitting connectivity signals form the serial ATA interface to a controller in order for the controller to determine a status of connectivity between an electronic device and the serial ATA interface, the circuit comprising:
   an input end connecting to any one of ground ends of the serial ATA interface, and electronically connecting to a high voltage source;
   a positive-negative-positive (PNP) iripolar transistor, a base of the PNP tripolar transistor being connected to the input end via a first resistor, an emitter of the PNP tripolar transistor being connected to a VCC via a second resistor;
   a first negative-positive-negative (NPN) tripolar transistor, a base of the first NPN tripolar transistor being connected to the emitter of the PNP tripolar transistor via a third resistor, a collector of the first NPN tripolar transistor being connected to the VCC via a fourth resistor;
   a second NPN tripolar transistor, a base of the second NPN tripolar transistor being connected to the collector of the first NPN tripolar transistor via a filth resistor, a collector of the second NPN tripolar transistor being connected to the VCC via a sixth resistor; and
   an output end connecting the collector of the second NPN tripolar transistor and the controller;
   wherein the input end is electronically connected to the output end, and a collector of the PNP tripolar transistor and emitters of the first and second NPN tripolar transistors are all grounded.

2. The circuit as recited in claim 1, wherein the controller is a programmable microprocessor.

3. The circuit as recited in claim 1, wherein a rating of each of the first resistor, the third resistor and the fifth resistor is approximately 1 kilo-ohm.

4. The circuit as recited in claim 3, wherein a rating of each of the second resistor, the fourth resistor and the sixth resistor is approximately 100 kilo-ohms.

5. The circuit as recited in claim 1, wherein the output end outputs different voltage levels to enable the controller to determine said status of connectivity.

6. The circuit as recited in claim 1, wherein a rating of the VCC is approximately +5 volts.

7. A device comprising:
   a back plane comprising:
      a controller;
      a first connector; and
      a circuit comprising:
         an input end connecting to any one of ground ends of the first connector, and electronically connecting to a high voltage source;
         a positive-negative-positive (PNP) bipolar transistor, a base of the PNP tripolar transistor being connected to the input end via a first resistor, an emitter of the PNP tripolar transistor being connected to a VCC via a second resistor;

a first negative-positive-negative (NPN) tripolar transistor, a base of the first NPN tripolar transistor being connected to the emitter of the PNP tripolar transistor via a third resistor, a collector of the first NPN tripolar transistor being connected to the VCC via a fourth resistor;

a second NPN tripolar transistor, a base of the second NPN tripolar transistor being connected to the collector of the first NPN tripolar transistor via a fifth resistor, a collector of the second NPN tripolar transistor being connected to the VCC via a sixth resistor; and an output end connecting the collector of the second NPN bipolar transistor and the controller, wherein the input end is electronically connected to the output end, and a collector of the PNP bipolar transistor and emitters of the first and second NPN tripolar transistors are all grounded; and a tray board comprising a second connector with a hard disk drive (HDD) coupled thereto, and the second connector being connected to the first connector.

* * * * *